United States Patent [19]

Salvi

[11] Patent Number: 4,612,214

[45] Date of Patent: Sep. 16, 1986

[54] METHOD FOR COATING SLABS OF NATURAL OR ARTIFICIAL STONE

[75] Inventor: Michele Salvi, Milan, Italy

[73] Assignee: Schering AG, Bergkamen, Fed. Rep. of Germany

[21] Appl. No.: 733,401

[22] Filed: May 13, 1985

Related U.S. Application Data

[63] Continuation of Ser. No. 577,599, Feb. 6, 1984, abandoned.

[30] Foreign Application Priority Data

Feb. 18, 1983 [DE] Fed. Rep. of Germany ....... 3305549

[51] Int. Cl.$^4$ .............................................. B05D 3/02
[52] U.S. Cl. ................................... 427/136; 427/386; 427/393.6
[58] Field of Search .................... 427/386, 393.6, 136, 427/220

[56] References Cited

U.S. PATENT DOCUMENTS

| | | | |
|---|---|---|---|
| 3,159,499 | 12/1964 | Jorda | 427/142 |
| 3,160,518 | 12/1964 | Jorda | 427/142 |
| 3,795,533 | 3/1974 | Gauri | 428/540 X |
| 4,060,953 | 12/1977 | Milne | 427/294 |
| 4,164,520 | 8/1979 | Waddill et al. | 525/484 |
| 4,190,719 | 2/1980 | Samejima et al. | 528/103 |
| 4,341,824 | 7/1982 | LeGrand | 427/136 |

FOREIGN PATENT DOCUMENTS 2833874 2/1979 Fed. Rep. of Germany .

*Primary Examiner*—Thurman K. Page

[57] ABSTRACT

A method for coating artificial or natural stone slabs with a curable mixture comprising an epoxy resin and a curing agent which is the reaction product formed between an epoxy resin and an aminoamide, or is a phenol-formaldehydeamine condensation product.

15 Claims, No Drawings

METHOD FOR COATING SLABS OF NATURAL OR ARTIFICIAL STONE

This application is a continuation of application Ser. No. 577,599 filed Feb. 6, 1984, now abandoned.

The present invention relates to a process for the coating of artificial or natural stone slabs with a curable mixture comprising an epoxy resin, a curing agent, and fibers or fabrics as reinforcing materials.

Artificial or natural stone slabs of marble or comprising marble are used in many areas of the construction industry, particularly as wall paneling, flooring, and facing for buildings. For these applications, large size slabs are required, especially in industrial practice.

With increasing slab size, the slab thickness must also increase, and sharply so, especially in the case of marble, because of the strength properties which are governed by the nature of the material. It is sought to keep the thickness as close as possible to the permissible lower limit, at the expense of increased frangibility.

The weight and frangibility of the slabs have given rise to problems not only in storage and transportation but also in such pretreating and aftertreating production operations as cutting to size, grinding, polishing, etc., and the use of such slabs has therefore been limited to the smaller sizes.

Attempts have already been made in the past to increase the stability of the slabs by applying a honeycomb-structured reinforcing layer to their underside. The drawback of this method is that it is high in material usage and costs and results in an increase in slab thickness that is excessive for many uses.

A method of producing thin slabs is described in published German patent application DOS No. 28 33 874. There, slabs about 2 cm thick are produced in a first pass of the saw, the resulting kerfs are filled with a curable synthetic resin, and the slabs are then cut to the final thickness in a second pass of the saw. The result is a so-called sandwich structure in which two outer stone slabs are bonded together by an intermediate synthetic resin layer. Before this pair of slabs is separated, reinforcing layers of glass fibers impregnated with synthetic resins may be applied to the outsides of the slabs.

However, before the reinforcing layer is applied, it is necessary to remove, in an intermediate drying operation, the moisture adsorbed by the slabs during the passes of the saw. This drying operation, which is absolutely necessary, requires the use of heating chambers in which the slabs are held, possibly at subatmospheric pressure, for a given length of time. Investment costs, heating costs, and holding time reduce the profitability of the method and the production capacity.

The object of the invention is to overcome these drawbacks and to provide a process whereby even moist slab surfaces can be coated directly with a curable synthetic resin and reinforcing materials.

In accordance with the invention, this object is accomplished by a process for the coating of artificial or natural stone slabs, and particularly slabs of marble or comprising marble, with curable synthetic resin mixtures comprising epoxy resins which on the average have more than one epoxy group per molecule and curing agents for the epoxy resins, with the concurrent use of fillers and reinforcements, and optionally of commonly used solvents. More in particular, the slabs are coated on one side with a curable mixture of
(A) at least one epoxy resin,
(B) at least one curing agent selected from the group consisting of
  (1) adducts of an epoxy resin and an excess of at least one member selected from the group consisting of aminoamide, aminoimidazoline, and/or aminoamide containing imidazoline groups, and
  (2) phenol-formaldehyde-amine condensation products, and
(C) fillers and/or reinforcements. Optionally,
(D) commonly used reactive diluents, curing agents, accelerators, solvents, wetting, and flow-control agents may be included.

The glycidyl compounds which are used in accordance with the invention are commercial products having more than one epoxy group per molecule and are derived from mono- or poly-hydric, mono- or poly-nuclear phenols, and particularly bisphenols, as well as novolacs. A comprehensive recitation of these di- and poly-phenols is found in the handbook "Epoxidverbindungen und Epoxidharze" ("Epoxy Compounds and Epoxy Resins") by A. M. Paquin, Springer Verlag, Berlin, 1958, Chapter IV, and in the "Handbook of Epoxy Resins" by Lee and Neville, 1967, Chapter 2.

Mixtures of two or more of the epoxy resins may also be used. The use of liquid glycidyl compounds comprising bis-phenol A (4,4'-dihydroxydiphenylpropane-2,2) or bisphenol F (4,4'-dihydroxydiphenylmethane) having epoxy values ranging from 0.4 to 0.55 is preferred.

Mixtures of the glycidyl compounds and so-called reactive diluents, for example, monoglycidyl ethers of phenols, may also be used. These reactive diluents serve primarily as viscosity reducers and should be used only in small amounts since they have an adverse effect on the final properties of the thermosetting resin.

The glycidyl compounds mentioned by way of example may be used both for the curable combinations and for the preparation of the curing agent/epoxy adducts which are used in the process of the invention.

In the process of the invention, curing agents and glycidyl compounds are preferably used in approximately equivalent amounts, based on active amine hydrogen atoms and reactive epoxy groups. However, the curing agents or the glycidyl component may also be used in excess or in deficiency. The amounts actually used depend on the desired final properties of the reaction product. Catalytic or reactive curing agents which are commonly used with epoxy resins may also be used in the process of the invention.

The curing agents according to (B) (1) which are used in accordance with the invention are adducts formed between an epoxy resin and a stoichometric excess of an aminoamide, aminoimidazoline, and/or an aminoamide containing imidazoline groups, which in turn are the reaction product formed between a monomeric or dimerized fatty acid and a stoichometric excess of a polyhydric amine, which amine may also contain hetero atoms such as oxygen.

Compounds which are known in the prior art as curing agents for epoxy resins, for example, those known from German Pat. Nos. 972,757 and 1,074,856; published German patent applications DAS Nos. 1,041,246, 1,089,544, 1,106,495, 1,295,869, and 1,250,918; British Pat. Nos. 803,517, 810,348, 873,224, 865,656, and 956,709; Belgian Pat. No. 593,299; French Pat. No. 1,264,244; and U.S. Pat. Nos. 2,705,223, 2,712,001, 2,881,194, 2,966,478, 3,002,941, 3,062,773 and 3,188,566; are suitable aminoamides, aminoimidazolines, and aminoamides containing imidazoline groups.

Particularly suitable for the process of the invention are aminoamides, aminoimidazolines, and aminoamides containing imidazoline groups which are prepared by the reaction of a polyamine with:

(a)(1) monocarboxylic acids, such as linear or branched alkylcarboxylic acids having from 2 to 22 carbon atoms, and more particularly from 2 to 4 and from 16 to 22 carbon atoms, and preferably 18 carbon atoms, such as acetic acid, propionic acid, butyric acid, caproic acid, caprylic acid, capric acid, lauric acid, and myristic acid, and especially natural fatty acids such as stearic acid, oleic acid, linoleic acid, linolenic acid, and fatty acid from tall oil; or from (a)(2) so-called dimeric fatty acids, obtainable by the polymerization by prior art methods of unsaturated natural or synthetic monobasic aliphatic fatty acids having from 16 to 22 carbon atoms, and preferably 18 carbon atoms. (See, for example, published German patent applications DOS No. 1,443,938 and No. 1,443,968, German Pat. No. 2,118,702, and published German patent application DAS No. 1,280,852.) Typical commercially available polymerized fatty acids have approximately the following position:

| | |
|---|---|
| Monomeric acids | 5 to 15 weight percent |
| Dimeric acids | 60 to 80 weight percent |
| Trimeric and higher-functional acids | 10 to 35 weight percent |

However, it is also possible to use fatty acids whose content of trimeric or higher functional groups, or whose dimer content, has been increased by appropriate distilling methods, or to use fatty acids which have been hydrogenated by prior art methods; or to use (a)(3) carboxylic acids obtained by the copolymerization of unsaturated higher fatty acids having from 16 to 22 carbon atoms, and preferably 18 carbon atoms, or their esters with aromatic vinyl compounds (see British Pat. No. 803,717, for example);

(a)(4) adducts of unsaturated higher fatty acids or fatty-acid esters and unsaturated lower mono- or di-carboxylic acids or anhydrides, such as fumaric acid, maleic acid, maleic anhydride, or acrylic acid (see published German patent applications DAS Nos. 1,295,829, 1,420,761 and 1,272,918, for example); or (a)(5) acids prepared by the reaction of unsaturated fatty acids, carbon monoxide, and water (see, for example, Reppe and Kroper, Ann. 582, pp. 63–65 (1953), and German Pat. No. 1,006,849); or (a)(6) epoxidized unsaturated higher fatty acids (see published German patent application DAS No. 1,041,246, for example; or (a)(7) the C$_{36}$ dicarboxylic acid described in U.S. Pat. No. 3,993,661, or as an hydroaromatic dicarboxylic acid, 1,4-cyclohexanedicarboxylic acid; or (a)(8) acids prepared by the addition of phenol or its substitution products to unsaturated monocarboxylic acids (see published German patent application DOS No. 1,543,754, for example), such as hydroxyphenylstearic acid or 2,2-bis(hydroxyphenyl)valeric acid, or products of addition of phenol to polycarboxylic acids such as dimeric fatty acid (see U.S. Pat. No. 3,468,920, for example. In such reactions, the acid and polyamine are recited such that the ratio of amine groups to carboxyl groups is greater than 1.

As a rule, the acids of the above groups are used as such for condensation with the polyamines; however, mixtures may also be used. The polyamino amides and polyamino imidazolines of the monomeric or polymeric fatty acids named under (a)(1) and (a)(2) have become particularly important in industry and therefore are preferably used in the process of the invention.

The amine components to be used in accordance with the invention for the preparation of component (B) are polyamines such as:

(aa)(1) polyethylene polyamines, for example diethylenetriamine, triethylenetetramine, or tetraethylenepentamine (see published German patent application DOS No. 1,543,754, for example); or (aa)(2) polypropylene polyamines and the polyamines obtained by cyanoethylation of polyamines, and particularly of ethylenediamine, and subsequent hydrogenation (see pamphlet of BASF AG 1976); or (aa)(3) aliphatic polyamines, including diamines, such as diamino- ethane, diaminopropane, diaminobutane, diaminohexane and 3,3,5- or 3,5,5-trimethyl-1,6-diaminohexane; or (aa)(4) cycloaliphatic polyamines such as 1-amino-3-aminomethyl-3,5,5-trimethylcyclohexane (isophoronediamine) and 1,4-diaminocyclohexane (see published German patent application DAS No. 1,694,958, for example; or (aa)(5) heterocyclic polyamines such as N-aminoethylpiperazine; or (aa)(6) polyether amines, prepared by the cyanoethylation of alkanols having at least 2 hydroxyl groups and subsequent hydrogenation, such as 1,12-diamino-4,8-dioxadodecane; or mixtures of two or more of the amines named under (aa)(1) to (aa)(6). In accordance with the invention, the polyamines named under (aa)(1) and (aa)(2) are preferably used.

In a preferred embodiment of the process, the curing agent according to (B) (1) is an adduct of an epoxy resin and a condensation product of a monomeric fatty acid having from 6 to 22 carbon atoms, and preferably 18 carbon atoms, and excess amine of the general formula

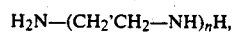

$H_2N-(CH_2'CH_2-NH)_nH$, wherein n stands for 1 to 5, and the curing agent according to (B) (2) is a condensation product of formaldehyde, phenol, and/or para-tert-butylphenol and/or isomeric nonylphenols and meta/para-xylylenediamine and/or trimethyl hexamethylenediamine.

For the preparation of adducts, the aminoamides, aminoimidazolines, and aminoamides containing imidazoline groups are conventionally reacted with the corresponding epoxy resins. In accordance with the invention, liquid epoxy resins based on bisphenol A and/or bisphenol F are preferred. The amounts of epoxy resin are selected so that approximately from 1/15th to ¼th, and preferably from 1/12th to 1/6th, of the reactive amine hydrogen atoms of the aminoamides, aminoimidazolines, or aminoamides containing imidazoline groups are reacted to form an adduct.

Phenol-formaldehyde-amine condensation products (Mannich bases) within the meaning of the present invention, (B) (2), are the reaction products of phenols, formaldehyde, and secondary and/or primary monamines or polyamines. The phenols used may be monophenols such as phenol, ortho-, meta- and para-cresol, isomeric xylenols, para-tert-butylphenol, para-nonylphenol, alpha-naphthol and beta-naphthol, as well as di- and polyphenols such as resorcinol, hydroquinone, 4,4'-dioxy-diphenyl, 4,4'-dioxydiphenyl ether, 4,4'-dioxydiphenylsulfone, 4,4'-dioxydiphenylmethane, bisphenol A, and the phenol-formaldehyde condensation products known as novolacs.

Dimethylamine, diethylamine, dipropylamine, dibutylamine, piperidine, pyrrolidine, morpholine, and methylpiperazine are suitable for use as secondary monamines. Suitable primary monamines include, for example, longer chain aliphatic monoamines such as coconut amines having from 8 to 18 carbon atoms.

Suitable polyamines are:

(a)(10) Polyethylene polyamines such as diethylenetriamine, triethylenetetramine, or tetraethylenepentamine (see published German patent application DOS No. 1,548,754, for example); or (a)(11) polypropylene polyamine and the polyamines obtained by the cyanoethylation of polyamines, and particularly of ethylenediamine, with subsequent hydrogenation (see pamphlet of BASF, 1976); or (a)(12) aliphatic polyamines such as diaminomethane, diaminopropane, neopentanediamine, diaminobutane, diaminohexane, 3,3,5- and 3,5,5-trimethyl-1,6-diaminohexane; or (a)(13) cycloaliphatic polyamines, such as 1-amino-3-aminomethyl-3,5,5-trimethylcyclohexane (isophoronediamine) and 1,4-diaminocyclohexane (see published German patent application DAS No. 1,694,958, for example); or (a)(14) heterocyclic polyamines, such as N-aminoethylpiperazine; or (a)(15) polyether amines, such as 1,12-diamino-4,8-dioxadodecane, and/or polyether polyamines of the general formula

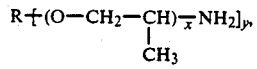

wherein x is an integer greater than 1, and more particularly from 2 to 20, y is 2, 3, 4, and R is hydrocarbon having a valence corresponding to y; or (a)(16) aromatic amines; or (a)(17) araliphatic diamines such as xylylenediamine; or mixtures of two or more of the amines named under (a)(10) to (a)(17). In accordance with the invention, the use of the polyamines named under (a)(10), (a)(11), (a)(14) and (a)(17) is preferred. The polyamines may also be used in admixture with monamines.

A comprehensive recitation of the phenols and amines which may be used is found in M. Tramontini, Synthese 1973, p. 703. With regard to the preparation of the Mannich bases, reference is also made to this publication.

The molar amounts of formaldehyde and amine reacted per mole of phenol depend on the number of groups susceptible of substitution. Phenol has three, bisphenol A four, and para-tert-butylphenol two such groups.

The Mannich bases which are preferably used in accordance with the invention are reaction products of optionally substituted phenols or of bisphenol A, formaldehyde, and dimethylamine having from 1 to 4 tertiary amine groups, longer chain aliphatic monoamines such as coconut amines having from 8 to 18 carbon atoms, polyamines such as hexamethylenediamine or trimethylhexamethylenediamine (a)(12), araliphatic polyamines such as xylylenediamine (a)(17), and heterocyclic diamines such as N-aminomethylpiperazine (a)(14).

Products obtained by an amine exchange reaction are suitable for use as further Mannich bases. Such a reaction occurs when Mannich bases of low boiling monamines are heated, optionally with the concurrent use of inert solvents, to temperatures of 100° C., and preferably between 130° C. and 180° C., with stirring. The secondary monoamine being liberated is continuously eliminated by distillation.

In accordance with the invention, reinforcing materials such as finely divided sands, metals, or metal compounds in chip or powder form, organic or inorganic fabrics, or fibers such as textile fibers or natural or synthetic fibers, asbestos, glass staple fibers, or glass fiber fabrics may be used.

If necessary, the solvents, dyes, pigments, and flame retardants commonly used in this field may be added for modification.

A better understanding of the present invention and of its many advantages will be had by referring to the following specific Examples, given by way of illustration.

PREPARATION OF POLYAMINOAMIDE/EPOXY RESIN ADDUCTS

Example 1

148 g of a dimerized fatty acid (monomeric fatty acid=13.6%, dimeric fatty acid=75.9%, trimeric fatty acid=10.5%) were heated with 79.5 g of triethylenetetramine (TETA) to 240° C. for 2 hours under nitrogen and with stirring. The temperature was maintained for 4 hours. After the first 2 hours, a vacuum of about 20 mm Hg was applied. The water of condensation formed was continuously distilled off by means of a distillation bridge.

The reaction product had an amine number of 400 and a viscosity of 0.4 Pa.sec at 75° C.

20 g of a diglycidyl ether comprising bisphenol A and having an epoxy value of 0.53 (corresponding to 1/12th of all reactive amine hydrogen atoms) were added to 120 g of the above reaction product and reacted for 1 hour at 50° C. to form an adduct.

Example 2

In accordance with Example 1, 133 g of tall oil fatty acid and 87 g triethylenepentamine (TEPA) were converted to an aminoamide (amine number about 450), and 120 g of this aminoamide were then reacted with 40 g of a diglycidyl ether (corresponding to 1/6th of all reactive amine hydrogen atoms) comprising bisphenol F (epoxy value=0.53) in accordance with Example 1.

The product had an amine number of about 350.

Example 3

The adduct of Example 2 was modified with 20 g of benzyl alcohol, 12 g of xylene, and 8 g of 2,4,6-tris(hydroxymethyl)phenol (DMP 30). The product had an amine number of about 250 and a viscosity of about 5 Pa.sec at 25° C.

Example 4

60 g of diethylenetriamine (DTA), 30 g of phenol, and 10 g of para-formaldehyde were reacted in a reaction vessel with stirrer and distillation head under a nitrogen atmosphere for 1 hour at 60° C. and the water of reaction was continuously distilled off.

The reaction product had an amine of 900 and a viscosity of about 0.8 Pa.sec at 25° C.

200 g of the above Mannich base were reacted in accordance with Example 1 with 100 g of an epoxy resin comprising bisphenol A (epoxy value=0.5) to yield the corresponding adduct, in which 1/10th of all reactive amine hydrogen atoms were preadducted.

Example 5

The adduct of Example 1 was modified by the addition of 15.8 g of trimethylhexamethylenediamine (as an additional commercial curing agent).

Example 6

In accordance with Example 4, a Mannich base was prepared from formaldehyde, para-tert-butylphenol, xylylenediamine, and trimethylhexamethylenediamine (TMD) in a mole ratio of 3:9:7:3.

The product had an amine number of 400 and a viscosity of 0.4 Pa.sec at 25° C.

Example 7

360 g of tall oil fatty acid and 160 g of pentaethylenehexamine were condensed in accordance with Example 1. The product had an amine number of about 300 and a viscosity of about 0.5 Pa.sec at 25° C.

120 g of this aminoamide were mixed with 30 g of xylylenediamine and 15 g of N-aminoethylpiperazine, adducted with 40 g of diglycidyl ether comprising bisphenol A and having an epoxy value of 0.53 in accordance with Example 1, and mixed with 40 g of para-tert-butylphenol and 25 g of benzyl alcohol.

The mixture had an amine number of about 250 and a viscosity of 0.54 Pa.sec at 60° C.

PREPARATION OF CURABLE MIXTURE 100 g of a diglycidyl ether comprising bisphenol F and having an epoxy value of 0.53 were mixed with vigorous stirring with 64 g of the adduct of Example 1 (equivalent amount, based on reactive amine hydrogen atoms). This mixture was ready for use and could be applied to the substrates by the usual methods.

The mixtures of the Examples listed in Table I which follows were prepared in a similar manner.

TABLE I

| Example | Adduct from Example | Parts by weight (g) Adduct | Parts by weight (g) Resin | Amount of epoxy resin, based on reactive amine hydrogen atoms |
|---|---|---|---|---|
| 8 | 1 | 64 | 100* | Equivalent |
| 9 | 1 | 70.4 | 100** | 10% excess |
| 10 | 2 | 88 | 100** | 10% excess |
| 11 | 2 | 72 | 100* | 10% deficiency |
| 12 | 3 | 100 | 100* | Equivalent |
| 13 | 4 | 33 | 100** | Equivalent |
| 14 | 5 | 95 | 100** | Equivalent |
| 15 | 3 | 88 | 100** | Equivalent |
|  | 6 | 12 |  |  |
| 16 | 7 | 85.5 | 100** | 10% excess |
| Comparison Example 17 | — | 13 TETA | 100** | Equivalent |

*Bisphenol F, epoxy value = 0.53
**Bisphenol A, epoxy value = 0.54

TEST FOR STRENGTH OF ADHESION

The synthetic resin mixtures used in accordance with the invention were tested for adhesive strength in the following manner:

Marble slabs were immersed in water for 2 hours at room temperature. The slabs were then briefly allowed to drain, their surface was coated with the synthetic resin mixtures to be tested, and aluminum test bodies were placed on it.

The film was then cured in a drying cabinet for 2 hours at 60° C. After cooling to room temperature, the adhesion of the cured synthetic resin coating to the marble surface was tested with the Mod. 432 Adhesion Tester made by Erichsen, Hamer/Westphalia (U.S. Pat. No. 3,527,093) by frontal removal of the aluminum test bodies.

Testing with reinforcing materials was carried out in the same manner except that, prior to the cure, the reinforcing materials were applied to or conventionally embedded in the adhesive layer.

TABLE II

| | Test for adhesion | | | |
|---|---|---|---|---|
| Example | Glass fabric | Glass fibers | Nonwoven fibrous-glass matting | Without reinforcements |
| 8 | SF | SF | SF | SF |
| 9 | SF | SF | SF | SF |
| 10 | SF | SF | SF | SF |
| 11 | SF | SF | SF | SF |
| 12 | SF | SF | SF | SF |
| 13 | SF | SF | SF | SF |
| 14 | SF | SF | SF | SF |
| 15 | SF | SF | SF | SF |
| 16 | SF | SF | SF | SF |
| Comparison Example 17 | AF | AF | AF | AF |

SF = Substrate fracture (fracture in marble)
AF = Adhesion failure

Example 18 (Test under technical conditions)

Marble/polyurethane foam/marble sandwich slabs measuring 1.30×3.10×0.007 meters were produced in the manner outlined in published German patent application DOS No. 28 33 874. Following sawing, the slabs were placed wet on a coating belt conveyor and preheated in an oven to accelerate curing after coating.

Coating was effected with a curable mixture of the adduct from Example 1 and approximately equivalent amounts of a diglycidyl ether comprising bisphenol F and having an epoxy value of 0.53.

First a thin layer of binder was applied by means of spraying, then the glass fibers were uniformly distributed and a second layer of binder was applied. The total amount of resin/curing agent (volume ratio, preferably 1:1) was about 350 to 500 g/m².

The coating was then cured for 2 hours at 70° C. in a hot air kiln.

After the second side of the sandwich had been similarly coated, the slabs were separated with a wood saw, cleaned of residual polyurethane foam, and polished.

Testing for strength of adhesion resulted also in this case in fracture in the marble.

What is claimed is:

1. A method for coating a water-moist slab of artificial or natural stone with a synthetic resin, which method comprises coating one side of said slab with a curable mixture comprising:
   (A) an epoxy resin having on the average more than one epoxy group per molecule; and
   (B) a curing agent selected from the group consisting of (1) adducts of an epoxy resin with an excess of a member selected from the group consisting of aminoamides, aminoimidazolines, and aminoamides containing imidazoline groups, and
(2) phenol-formaldehyde amine condensation products; and
(C) at least one filler and/or reinforcement.

2. A method as in claim 1 wherein said curing agent comprises a compound (B)(1) and a compound (B)(2).

3. A method as in claim 2 wherein said compound (B)(1) is an adduct formed between an epoxy resin and a condensation product of a monomeric fatty acid having from 16 to 22 carbon atoms with excess amine.

4. A method as in claim 3 wherein said amine is a polyalkylene polyamine of the formula $H_2N-(CH_2-CH_2-NH)_nH$, wherein n is an integer from 1 to 5.

5. A method as in claim 1 wherein said curing agent (B)(2) is a condensation product of formaldehyde, a mono- or poly-hydric phenol, and an aliphatic or araliphatic polyhydric amine or a mixture of such amines.

6. A method as in claim 2 wherein said curing agent (B)(2) is a condensation product of formaldehyde, a mono- or poly-hydric phenol, and an aliphatic or araliphatic polyhydric amine or a mixture of such amines.

7. A method as in claim 3 wherein said curing agent (B)(2) is a condensation product of formaldehyde, a mono- or poly-hydric phenol, and an aliphatic or araliphatic polyhydric amine or a mixture of such amines.

8. A method as in claim 4 wherein said curing agent (B)(2) is a condensation product of formaldehyde, a mono- or poly-hydric phenol, and an aliphatic or araliphatic polyhydric amine or a mixture of such amines.

9. A method as in claim 5 wherein said phenol is at least one member selected from the group consisting of phenol, para-tert-butylphenol, and isomeric nonylphenols, and said amine is at least one member selected from the group consisting of trimethylhexamethylenediamine, meta-xylenediamine, and para-xylylenediamine.

10. A method as in claim 6 wherein said phenol is at least one member selected from the group consisting of phenol, para-tert-butylphenol, and isomeric nonylphenols, and said amine is at least one member selected from the group consisting of trimethylhexamethylenediamine, meta-xylenediamine, and para-xylylenediamine.

11. A method as in claim 7 wherein said phenol is at least one member selected from the group consisting of phenol, para-tert-butylphenol, and isomeric nonylphenols, and said amine is at least one member selected from the group consisting of trimethylhexamethylenediamine, meta-xylenediamine, and para-xylylenediamine.

12. A method as in claim 8 wherein said phenol is at least one member selected from the group consisting of phenol, para-tert-butylphenol, and isomeric nonylphenols, and said amine is at least one member selected from the group consisting of trimethylhexamethylenediamine, meta-xylenediamine, and para-xylylenediamine.

13. A method as in claim 1 wherein said filler or reinforcement is glass fibers or a glass fiber fabric.

14. A method as in claim 1 wherein said curable mixture comprises an amine curing agent in addition to curing agent (B).

15. A method as in claim 1 wherein said water-moist slab is of marble or comprises marble.

* * * * *